United States Patent
Fan et al.

(10) Patent No.: US 6,310,692 B1
(45) Date of Patent: *Oct. 30, 2001

(54) DYNAMIC, PREVENTIVE, CENTRALIZED PRINTER RESOURCE MANAGEMENT SYSTEM AND METHOD

(75) Inventors: ShengKuo Fan, Los Angeles, CA (US); Yasuo Nakajima, Urawa (JP); Joseph Fung, Artesia; Shee-Yen Tan, Walnut, both of CA (US)

(73) Assignees: Kuji Xerox Co. Ltd., Tokyo (JP); Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/079,362

(22) Filed: May 15, 1998

(51) Int. Cl.[7] .................................................. G06K 15/00
(52) U.S. Cl. ........................................ 358/1.14; 358/1.15
(58) Field of Search ................................ 358/1.15, 1.16, 358/1.14, 1.13, 1.11, 1.9, 1.1, 1.2, 1.17, 1.18, 404, 406, 407, 434–439, 441, 444, 468; 710/15, 18, 19; 399/8, 18, 21, 24, 25, 27, 28, 29, 87; 347/3, 5

(56) References Cited

U.S. PATENT DOCUMENTS

| | | | |
|---|---|---|---|
| 5,220,674 | * | 6/1993 | Morgan et al. ...................... 358/1.11 |
| 5,699,493 | * | 12/1997 | Davidson, Jr. et al. ............ 358/1.15 |
| 5,720,015 | * | 2/1998 | Martin et al. ...................... 358/1.15 |
| 5,727,135 | * | 3/1998 | Webb et al. ........................ 358/1.14 |

FOREIGN PATENT DOCUMENTS

Wo 94/11804  *  5/1994  (WO).

* cited by examiner

Primary Examiner—Dov Popovici
(74) Attorney, Agent, or Firm—Oliff & Berridge, PLC

(57) ABSTRACT

A dynamic, preventive, centralized printer resource management system provides dynamic, preventive monitoring of printer resources and centralization of the supervision of printer resources in a print management system. The system dynamically monitors the printer resources and delivers warning messages to system administrators, end users, and/or vendors when a printer resource falls below a predetermined threshold. Further, the printer resources can be monitored from a single, centralized location, such as a control panel proximate the system administrator. Notification of printer resource warnings can also be electronically delivered to end users, system operators, and/or vendors. Thus, the printer resource deficiency can be investigated by the administrator, user, or vendor, and resolved prior to the printer resource becoming entirely exhausted.

13 Claims, 5 Drawing Sheets

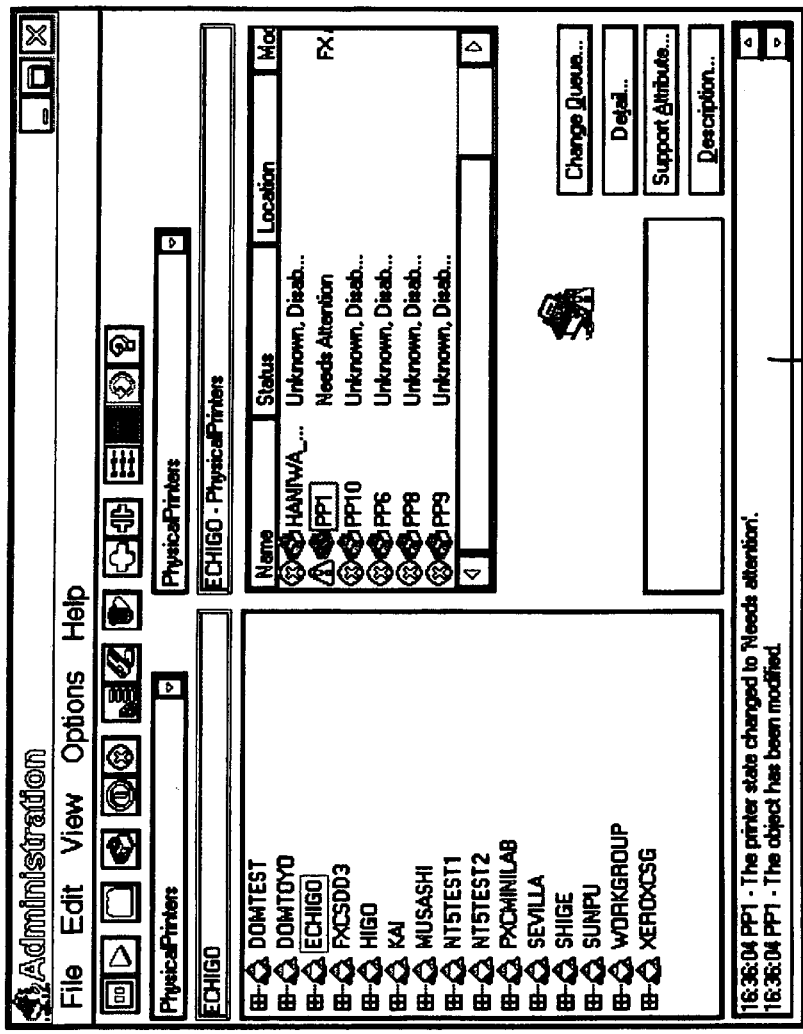
Fig. 5
Fig. 6
Fig. 7
Fig. 8

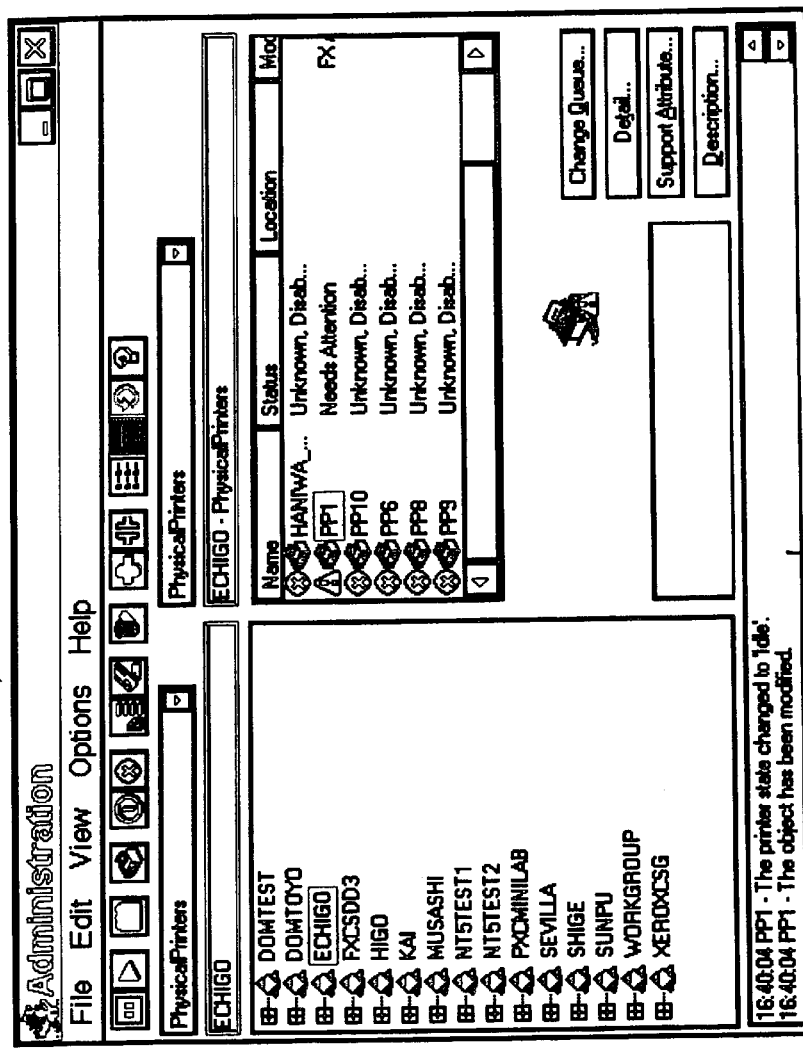

DYNAMIC, PREVENTIVE, CENTRALIZED PRINTER RESOURCE MANAGEMENT SYSTEM AND METHOD

BACKGROUND OF THE INVENTION

1. Field of Invention

This invention relates to the management of printer resources in a print management system. In particular, this invention is directed to dynamic, preventive monitoring of printer resources, and centralizing the supervision of printer resources.

2. Description of Related Art

Print management systems provide a method for controlling and accessing various printers, as well as managing printer resources and other related information, from both proximate and remote locations. However, in the current print management systems, problems arising with printer resources, such as paper supply, toner or ink level, and drum quality, are not resolved until after the problems arise. For example, a system administrator or user located remotely from a printer is not aware of a "low paper" level for that printer until the paper tray is entirely empty. At that point, the printer will not operate until the paper supply is replenished. Thus, any print jobs already sent to the printer will not be printed until the paper supply is replenished. This problem is quite common and causes significant inconvenience and time delay.

As shown in FIG. 1, the basic conventional print management system 10 uses a client/server architecture that includes three primary components: a client 20, a server 40, and an output device 50. The client 20 conveys print and management requests to the server 40 and receives responses from the server 40 that arise in response to the submitted requests. In general, although not shown in FIG. 1, in these conventional print management systems, a large number of clients 20 will be connected to the server 40. Similarly, although not shown in FIG. 1, a large number of output devices 50 are usually connected to the server 40 and are located at widely distributed locations. The users of the clients 20 can include system administrators, system operators, and other end users.

The server 40 receives these requests from the clients 20, performs the required actions for each request, and returns the responses to the corresponding client 20. One such request from a client 20 is a print request, i.e., a request to print one or more copies of one or more documents, with the printed pages output using one or more features. The features can include simplex or duplex printing, stapling or binding, and the like. Thus, a print request represents a collection of one or more documents to be printed, as well as instructions for printing. The server 40 organizes the documents indicated in the print request submitted by the client into a print job. The server then sends the print job and any associated job control commands to the requested one of the output devices 50.

Each of the output devices 50 is a physical device, or hardware, that is capable of rendering images of documents and producing hard copy output of the print jobs received from the server 40. Each output device 50 can then return responses to the server 40 regarding its current state or the status of the received print jobs. The output device 50 is commonly a printer.

Recently, more efficient print management systems have been developed. The efficient distribution of print jobs in a print management system is described, for example, in U.S. patent application Ser. No. 08/966,404, filed Nov. 7, 1997, and incorporated herein by reference in its entirety.

As shown in FIG. 2, the incorporated '404 application discloses a network print management system 100. The network print management system 100 includes a network server 140, a number of clients 120 and a number of printers 150, although FIG. 2 shows only one such client 120 and printer 150. The network server 140 includes a spooler 142 and a supervisor 146. The supervisor 146 present on the network server 140 can detect and report printer problems, such as a paper jam or an empty paper tray. However, as discussed above, these problems are not detected and reported until after the problem has disabled the particular printer 150. A system administrator or user would then have to respond to the printer problem. Until the problem is resolved, the disabled printer 150 is inoperable. Thus, the network print management system 100 may become backlogged with print jobs. The print jobs already submitted to the disabled printer 150 will wait in the queue 144 until the problem is resolved.

Also, as shown in FIG. 2, the network print management system 100 includes a database 160 for storing system attributes. The term "attributes" refers to the characteristics of print jobs, documents, logical printers, and physical printers. The database 160 is used to store attributes representing fixed reference values, as well as attributes representing system characteristics that are continuously updated as the print management system dynamically changes.

Thus, the attributes are collections of data that describe the entities that form the network print management system 100. In other words, the attributes define or characterize print management systems abstract entities, or objects. For example, document attributes, such as plex, margin, orientation, etc., describe how the printed material should appear. Printer attributes, such as media-ready, fonts-ready, etc., describe the available resources or features of the printer. Other printer attributes may describe the various printing features that users may use to produce high-quality documents, or they may describe status or configuration information, such as the printer's state or location. In addition to these attributes, there are a suite of attributes to facilitate end user, operator and administrator functions. In summary, the attributes are a set of data that describes the objects of the printer management system 100.

SUMMARY OF THE INVENTION

System administrators, end users, and vendors need to manage printer resources such as paper supply, toner/ink levels, and drum quality. They need to replace the paper supply, replace ink/toner cartridge, and change the drum before the supplies become completely exhausted. If one or more of these resources become completely exhausted, the printer will not operate until the problem is resolved. Presently, the only way to monitor the printer resources is to travel to the location of each printer and observe that printer and any display on that printer. Thus, monitoring the status of these printer resources is tedious in a network environment, because the printers can be located in a plurality of locations remote from the system administrator.

This invention provides a method and apparatus for dynamic, preventive monitoring of printer resources and for centralizing the supervision of printer resources.

This invention further provides a graphical user interface window that allows the system administrator to view and manage these resources for one or more output devices remotely from the various output devices.

This invention also provides a set of graphical user interface windows to notify the system administrator, and possibly end users, when the status of one of the output devices changes, and of the changed attribute.

Dynamic, preventive monitoring is accomplished by a print management system that dynamically monitors the printer resources and sends warning messages to system administrators, end users, and/or vendors when a printer resource falls below a predetermined threshold. Thus, the problem could be investigated by the administrator, user, or vendor, and resolved prior to the printer resource becoming entirely exhausted.

Additionally, the printer resources can be monitored from a single, centralized location, such as a graphical user interface window providing a control panel on a client being used by the system administrator. Graphical user interface windows providing printer resource warnings can also be electronically displayed on the clients being used by the end users, the system operators, and/or vendors.

These graphical user interface windows can provide advanced warning messages which allow the system administrator to schedule printer maintenance for required, but previously unscheduled, repairs or for standard maintenance. This avoids printer down-time and improves the overall efficiency of the print management system.

These and other features and advantages of this invention are described or are apparent from the following detailed description of the preferred embodiments.

BRIEF DESCRIPTION OF THE DRAWINGS

The preferred embodiments of this invention will be described in detail, with reference to the following drawings, wherein like numerals represent like elements and wherein:

FIGS. 5 and 9 show control panel graphical user interface windows usable to remotely view the attributes and status of the output devices according to this invention; and FIGS. 6–8 and 10–12 show exemplary notification message graphical user interface windows usable to notify a user or system administrator of changes in an output device's status and/or attribute according to this invention.

DETAILED DESCRIPTION OF PREFERRED EMBODIMENTS

The following embodiments illustrate dynamic, preventive monitoring of printer resources, and centralizing of the supervision of printer resources in network printing systems. However, the use of this invention in network printing systems is only an exemplary illustration. The dynamic, preventive monitoring of printer resources, and centralizing of the supervision of printer resources may be applied to any document output system.

Figure 1:
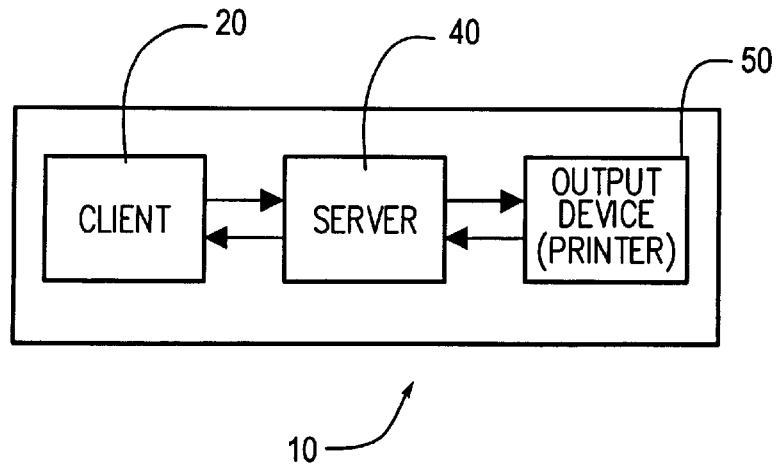
FIG. 1 is a diagram of a simple, conventional print management system.
Figure 2:
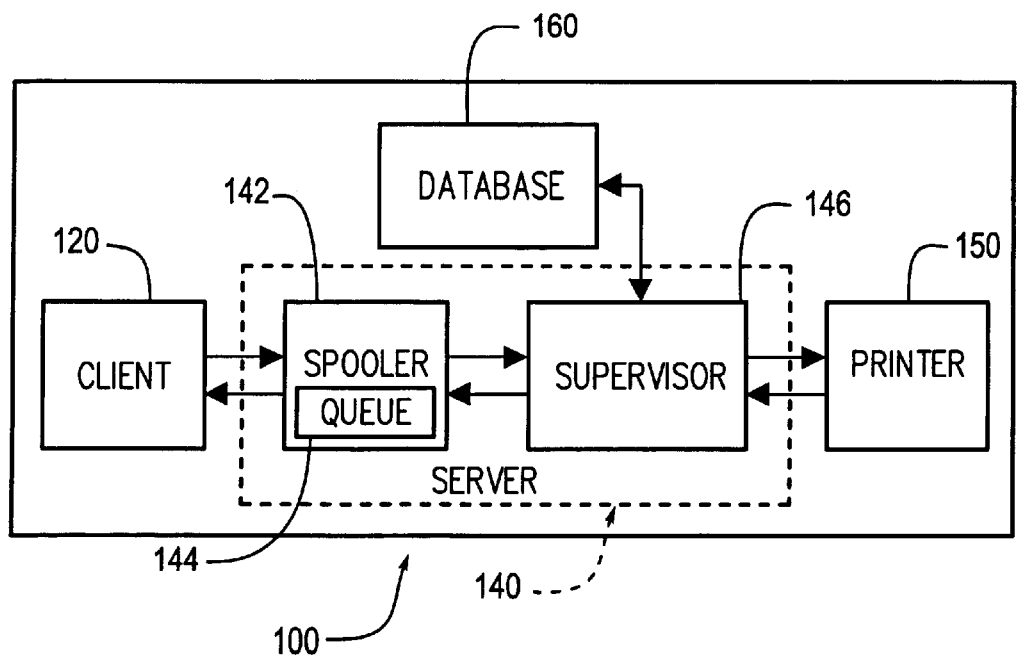
FIG. 2 is a diagram of a more complex, conventional print management system.
Figure 3:
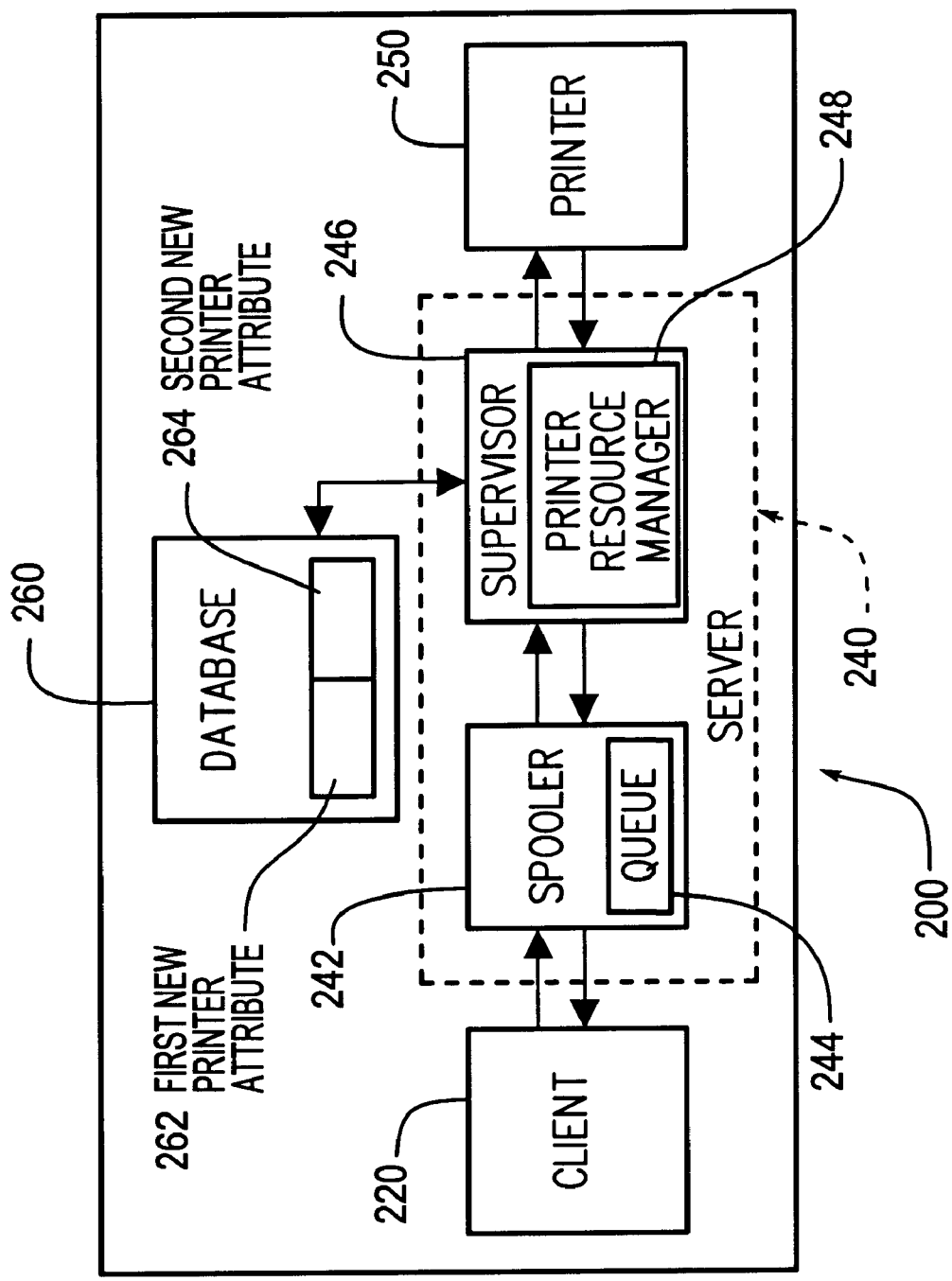
FIG. 3 is a diagram of a print management system including a printer resource management system according to this invention.

FIG. 3 illustrates a print management system including a printer resource management system of this invention. The print management system 200 includes a number of clients 220, a server 240, a number of printers 250, and a database 260, although FIG. 3 shows only one such client 220 and one such printer 250. Each printer 250 must be capable of dynamically supplying the printer resource levels to the print management system 200 of the particular network. Each printer 250 should communicate with the print management system 200 via a network management protocol, for example, simple network management protocol (SNMP), and must be capable of resource information recognition.

The server functions are divided between a spooler 242 and a supervisor 246. The spooler 242 also includes a queue 244 to store print jobs waiting to be output. Users of the clients 220 include users having varying levels of authority, such as system administrators, system operators, and other end users.

For each printer 250, two new printer attributes 262 and 264 are added to the database for each printer resource that needs to be monitored. The first new printer attribute 262 for each monitored printer resource corresponds to the dynamically changing printer resource level for that resource. For example, the monitored printer resource can be the printer paper level, the printer image forming device quality level, the printer ink level, the printer toner level, and the like. The second new printer attribute 264 for each monitored printer resource corresponds to the predetermined printer resource threshold for that resource. For example, monitored printer resource can be a printer paper threshold, a printer image forming device quality threshold, a printer ink threshold, a printer toner threshold, and the like.

It should be appreciated that the printer resource management system of this invention can also monitor and notify administrators, end users, and vendors of deficient physical properties of the printers 250, such as a paper jam, an open printer cover, and the like.

The threshold for any monitored printer resource set by the second new printer attribute 264 can be changed by a system administrator or other user with the necessary authority level to invoke such a change. The threshold setting policy may be determined by the system administrator. For example, higher thresholds can be set for more remote printers, as well as for higher volume printers. Thus, the thresholds for each printer can be customized according to printer location, printer capacity, printer workload, configuration of the printing environment, etc.

It should be appreciated that the thresholds can also be dynamically modified by the print management system itself, based on the actual accounting information maintained by the print management system 200.

As shown in FIG. 3, the print management system 200 having this printer resource management system thus includes a printer resource system manager 248. The printer resource system manager 248 resides on the supervisor 246 of the server 240. The printer resource system manager 248 includes a notification profile for each printer and/or for each monitored resource. Through the notification profile, the system administrator or other authorized user can designate which end users and/or vendors will receive notification of a printer resource deficiency, depending on the printer and/or the deficiency. The notification profile can also be used to designate the type of electronic communication will be used to notify the designated end users and/or vendors (i.e., e-mail, direct paging, etc.).

The operation of the printer resource system manager 248 is now described. First, the printer resource system manager 248 obtains the printer resource levels from each printer 250. Information regarding the printer resource levels can be obtained by several methods. Two such methods are a pulling model and a pushing model. In a pulling model, the supervisor 246 periodically extracts printer resource information from each printer. In a pushing model, each printer 250 periodically reports printer resource information to the supervisor 246. The primary difference between the aforementioned models is that in the pushing model, the output device 250 initiates the process of updating the printer resource levels, whereas, in the pulling model, the supervisor 246 initiates the process of updating the printer resource levels. In the pulling model, the time period for the periodical updates can be varied as desired. It can be appreciated that any model capable of performing data acquisition and reporting between printers 250 and a supervisor 246 would be acceptable.

Next, the printer resource system manager 248 updates the printer resource level attributes in the database 260 according to the printer resource information received from the printer 250. The printer resource system manager 248 then compares the attributes for the updated printer resource levels with the attributes for the printer resource thresholds. The printer resource system manager 248 notifies clients 220, designated through the notification profile, of the printer 250 and the corresponding deficient resource level or problem. It should be appreciated that the printer resource system manager 248 continually operates as long as the server 240 is operational.

Figure 4:
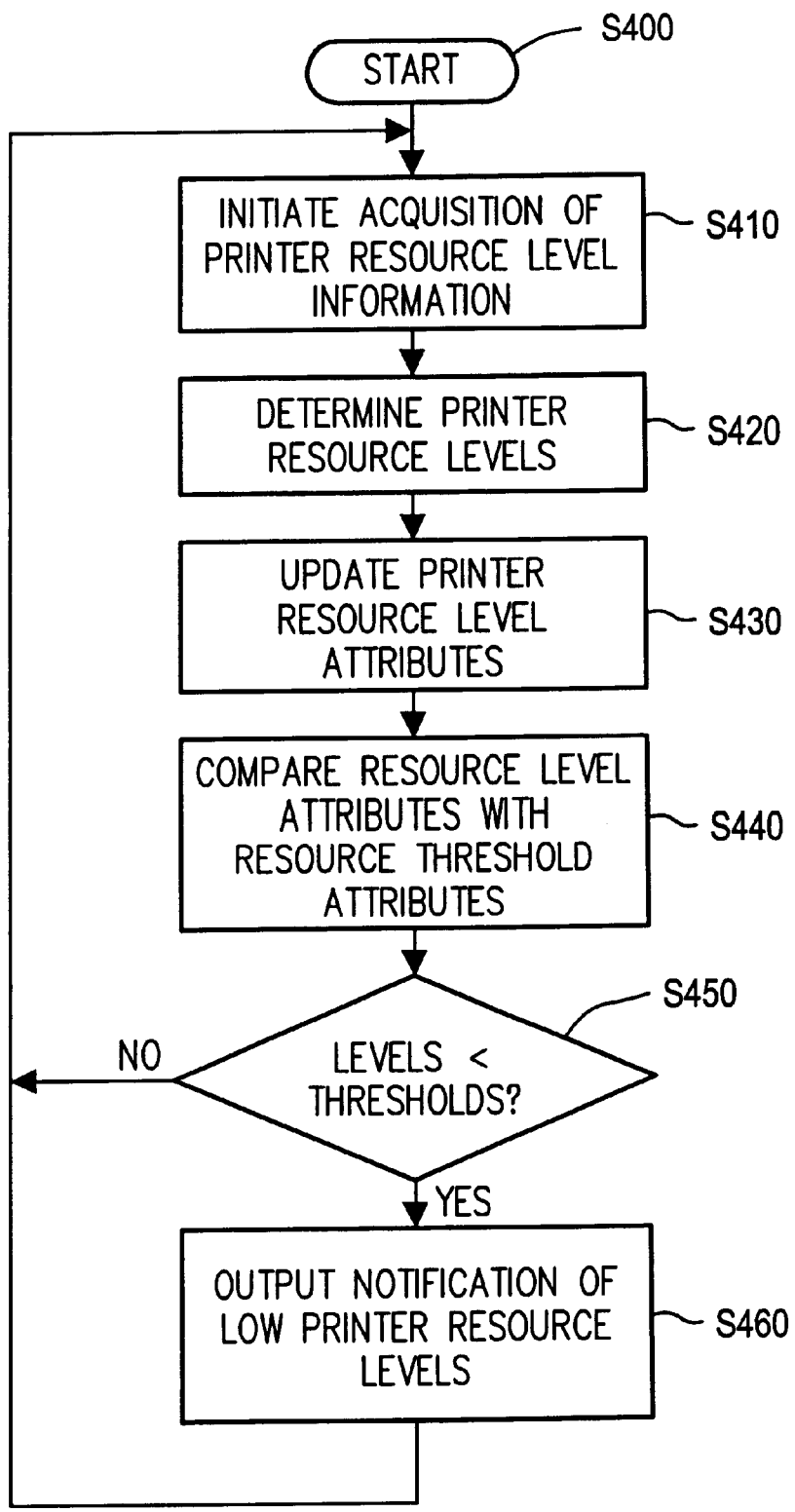
FIG. 4 is a flowchart outlining one method of printer resource management according to this invention.

FIG. 4 is a flowchart outlining one preferred operation of the printer resource management system of this invention. Beginning at step S400, control continues to step S410, where acquisition of printer resource level information is initiated. Next, in step S420, the current printer resource levels are determined. Next, in step S430, the printer resource level attributes are updated according to the current printer resource levels. Then, in step S440, the attributes for the updated printer resource levels are compared with the attributes for the printer resource thresholds.

In step S450, it is determined whether the printer resource level attributes are less than the printer resource level thresholds. If the printer resource level attributes are not less than the printer resource level thresholds, control returns to step S410 for further monitoring of printer resource levels. If the printer resource level attributes are less than the printer resource level thresholds, control proceeds to step S460.

In step S460, a notification of the deficient printer resource level is generated and transmitted. In particular, the notification is generated and transmitted based on the notification profile for the printer experiencing the noteworthy event and/or the type of event. Following step S460, control returns to step S410 for further monitoring of printer resource levels. It should be appreciated that the printer resource management system continually operates as long as the server 240 continues running.

The notification profile can be configured to notify, i.e., transmit the notification to, the system administrator, one or more end users, and/or a vendor of the particular printer resource that is below the threshold. The notification profile is also used to identify the delivery method or transmission type, i.e., e-mail, paging, etc.

Therefore, the system administrator can monitor the status of all printers from a computer console at one central location. Thus, the printer resource system manager 248 eliminates the need for a system administrator, or other network system personnel, to be at each printer to monitor its status.

FIGS. 5 and 9 show a control panel graphical user interface window 500 usable to remotely view the attributes and status of the output devices. The graphical user interface window 500 includes a text scroll box 505 for dynamically displaying system information to a system administrator or other authorized user. As shown in FIGS. 5 and 9, the displayed information may include notification of deficient printer resource levels, printer hardware problems, and changes in printer status. FIGS. 5 and 9 are essentially the same except for the contents of the text scroll box 505.

FIGS. 6–8 and 10–12 show examples of a sequence of notification message graphical user interface windows 590 usable to notify a user or system administrator of changes in an output device's status and/or attributes. As shown in FIGS. 6 and 10, a message 595 is displayed that provides notification that the status of a particular printer 250 has changed. Then, as shown in FIGS. 7 and 11, a message 595 is displayed regarding the specific state of the printer 250, for example, printer needs attention, printer is idle, etc. Next, as shown in FIGS. 8 and 12, a message 595 is displayed to provide notification of the deficiency of the printer 250, as shown in FIG. 8, or to confirm resolution of the deficiency, as shown in FIG. 12.

It should be appreciated that the printer resource system manager 248 can be configured so that once a printer resource falls below the corresponding threshold, the system administrator, end user, and/or vendor will be constantly notified of the warning and a continuous update of the printer resource level will be provided as the level continues to drop.

It should be appreciated that the printer resource system manager 248 can be implemented with multiple thresholds so that a first warning can be provided when a first threshold is reached and subsequent more obvious and/or more critical warnings are provided when each successive threshold is reached.

As shown in FIG. 4, as well as in the example outlined above, the dynamic, preventive, centralized printer resource management system of this invention, implemented by the printer resource system manager 248, is preferably implemented on a programmed general purpose computer. However, the implementation of non-persistent attributes can also be performed on a special purpose computer, a program microprocessor or microcontroller and peripheral integrated circuit elements, and ASIC or other integrated circuit, a hardwired electronic or logic circuit such as a discrete element circuit, a programmable logic device such as a PLD, PLA, FGPA or PAL or the like. In general, any device in which a finite state machine capable of implementing the flow chart shown in FIG. 4 in the example illustrated above can be used to implement the dynamic, preventive, centralized printer resource management system.

While this invention has been described with specific embodiments thereof, it is evident that many alternatives, modifications and variations will be apparent to those skilled in the art. Accordingly, the preferred embodiments of this invention as set forth herein are intended to be illustrative, not limiting. Various changes may be made without departing from the spirit and scope of this invention as defined in the following claims.

What is claimed is:

1. A printer resource management system comprising:
    a database that stores, for each of at least one printer, at least one pair of attributes, each pair of attributes representative of a printer resource level and a corresponding modifiable printer resource threshold for preventive monitoring of printer resource, the modifiable printer resource threshold being modified according to at least one of printer location, printer capacity, printer workload, and configuration of printing environment;

a printer resource manager that receives at least one updated printer resource level from one of the at least one printer, updates a corresponding printer resource level attribute in the database, compares each updated printer resource level attribute with the corresponding modifiable printer resource threshold attribute to determine whether the corresponding printer resource level is deficient, and generates and outputs an advanced notification if that printer resource level is deficient;

at least one output device that receives and displays the notification from the printer resource manager without interrupting the at least one printer.

2. The system of claim 1, wherein the printer resource level is one of paper level, ink level, toner level, and image forming device quality level.

3. The system of claim 1, wherein the printer resource threshold is one of paper threshold, ink threshold, toner threshold, and image forming device quality threshold.

4. The system of claim 1, wherein the printer resource manager comprises:

a graphical user interface for displaying the notification on the at least one output device.

5. A printer resource management system, comprising:

storing means for storing in a database, for each of at least one printer, at least one pair of attributes, each pair of attributes representative of a printer resource level and a corresponding modifiable printer resource threshold for preventive monitoring of printer resource, the modifiable printer resource threshold being modified according to at least one of printer location, printer capacity, printer workload, and configuration of printing environment;

managing means for receiving at least one updated printer resource level from one of the at least one printer, the managing means comprising updating means for updating a corresponding printer resource level attribute in the database, comparing means for comparing each updated printer resource level attribute with the corresponding modifiable printer resource threshold attribute to determine whether the corresponding printer resource level is deficient, and notifying means generating and outputting an advanced notification regarding the deficient printer resource level; and output means for receiving and outputting the notification.

6. The system of claim 5, wherein the printer resource level is one of paper level, ink level, toner level, and image forming device quality level.

7. The system of claim 5, wherein the printer resource threshold is one of paper threshold, ink or toner threshold, and image forming device quality threshold.

8. The system of claim 5, wherein the managing means further comprises graphical user interface means for displaying the notification on the output means.

9. A method for managing printer resources, comprising:

storing in a database, for each of at least one printer, at least one pair of attributes representative of a printer resource level and a corresponding modifiable printer resource threshold for preventive monitoring of printer resource, the modifiable printer resource threshold being modified according to at least one of printer location, printer capacity, printer workload, and configuration of printing environment;

receiving at least one updated printer resource level from one of the at least one printer;

updating a corresponding printer resource level attribute in the database;

comparing each updated printer resource level attribute with the corresponding modifiable printer resource threshold attribute;

determining whether the corresponding printer resource level is deficient; and generating and outputting an advanced notification if that printer resource level is deficient.

10. The method of claim 9, wherein the printer resource level is at least one of paper level, ink or toner level, and print drum quality level.

11. The method of claim 9, wherein the printer resource threshold is at least one of paper threshold, ink or toner threshold, and print drum quality threshold.

12. The method of claim 9, wherein the outputting of the advanced notification comprises displaying the notification on at least one output device.

13. The method of claim 12, wherein the displaying of the notification comprises displaying the notification using a graphical user interface.

* * * * *

UNITED STATES PATENT AND TRADEMARK OFFICE
CERTIFICATE OF CORRECTION

PATENT NO.    : 6,310,692 B1                                          Page 1 of 1
DATED         : October 30, 2001
INVENTOR(S)   : ShengKuo Fan, Yasuo Nakajima, Joseph Fung and Shee-Yen Tan It is certified that error appears in the above-identified patent and that said Letters Patent is hereby corrected as shown below:

<u>Title page,</u>
Item [*], Notice, please delete "This patent is subject to a terminal disclaimer."

Signed and Sealed this

Thirtieth Day of July, 2002

*Attest:*

*Attesting Officer*

JAMES E. ROGAN
*Director of the United States Patent and Trademark Office*